US012638860B2

(12) United States Patent
Albrecht et al.

(10) Patent No.: US 12,638,860 B2
(45) Date of Patent: May 26, 2026

(54) METHOD AND APPARATUS FOR REMOTE CONTROL OF A VEHICLE

(71) Applicant: ROBERT BOSCH GMBH, Stuttgart (DE)

(72) Inventors: Benno Albrecht, Holzmaden (DE); Nicolas Velz, Stuttgart (DE); Thomas Scheuerle, Friolzheim (DE); Meike Fehse, Nersingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 258 days.

(21) Appl. No.: 18/528,414

(22) Filed: Dec. 4, 2023

(65) Prior Publication Data

US 2024/0210957 A1      Jun. 27, 2024

(30) Foreign Application Priority Data

Dec. 6, 2022    (DE) .......................... 102022213144.4
Dec. 4, 2023    (DE) .......................... 102023212189.1

(51) Int. Cl.
| | |
|---|---|
| *G05D 1/622* | (2024.01) |
| *B60W 30/06* | (2006.01) |
| *G05D 1/222* | (2024.01) |
| G05D 109/10 | (2024.01) |
| G05D 111/30 | (2024.01) |

(52) U.S. Cl.
CPC ............. *G05D 1/622* (2024.01); *B60W 30/06* (2013.01); *G05D 1/222* (2024.01); *G05D 2109/10* (2024.01); *G05D 2111/30* (2024.01)

(58) Field of Classification Search
CPC ........ B60W 30/06; G05D 1/622; G05D 1/222
See application file for complete search history.

(56) References Cited

U.S. PATENT DOCUMENTS

| | | | |
|---|---|---|---|
| 11,654,894 B2 * | 5/2023 | Matsunaga | ........... B60W 30/06 701/25 |
| 2019/0204821 A1 * | 7/2019 | Yoon | .................... G05D 1/0223 |
| 2025/0178592 A1 * | 6/2025 | Shimamoto | ........ B62D 15/0285 |

FOREIGN PATENT DOCUMENTS

| | | |
|---|---|---|
| DE | 102008029348 A1 | 12/2009 |
| DE | 102014211548 A1 | 12/2015 |
| DE | 102015209976 A1 | 12/2016 |
| DE | 102018210361 A1 | 1/2020 |
| EP | 2617627 B1 | 10/2016 |

* cited by examiner

*Primary Examiner* — Luke Huynh
(74) *Attorney, Agent, or Firm* — NORTON ROSE FULBRIGHT US LLP

(57)    ABSTRACT

A method and apparatus for remote control of a vehicle. An input and/or remote control device is provided. The apparatus includes: a transceiver device in the vehicle, configured to exchange signals with the input and/or remote control device; sensors mounted in or on the vehicle for detecting the environment of the vehicle; a signal from the input and/or remote control device to the transceiver device activates an operating mode in the vehicle in which the vehicle moves to a target position independently, i.e., without the assistance of a driver located in the vehicle. The target position is in a first direction of travel of the vehicle. The vehicle, in the operating mode, also moves in the second direction of travel opposite the first direction of travel depending on the detected environment. The vehicle can also move away from the target position in order to reach the target position.

10 Claims, 5 Drawing Sheets

METHOD AND APPARATUS FOR REMOTE CONTROL OF A VEHICLE

FIELD

The present invention relates to a method and apparatus for remote control of a vehicle.

BACKGROUND INFORMATION

Systems for remote control of motor vehicles (e.g., passenger cars) are available in the related art. These are in particular systems with which a user who is located outside a motor vehicle can initiate and execute driving maneuvers of the vehicle by means of a remote control device. In particular for maneuvering in situations where only a limited view is available from inside the vehicle, the driver of the vehicle can move to a position outside the vehicle from which, for example, narrow spaces between the vehicle and its environment can be more easily assessed and corresponding steering or control maneuvers for the vehicle can be more safely executed. In addition, vehicles can be parked so close together that exiting would no longer be possible after the parking position has been reached. This saves space and makes parking and maneuvering easier for the driver. One of the most important applications for such a function is when entering and exiting garages, the narrow width of which makes it difficult to exit and enter comfortably. Such a system is described, for example, in European Patent Application No. EP 2617627 B1.

SUMMARY

The present invention is based on a method and an apparatus described at the outset for remote control of a vehicle, in particular a motor vehicle. In addition to the vehicle, an input and/or remote control device is provided, whereby the term "remote control" simply refers to an input means that can be operated by the driver or a user. The driver or user does not necessarily have to be outside the vehicle when making inputs. Furthermore, the following is provided:

A transceiver device located in the vehicle, which is configured to exchange signals with the input and/or remote control device.

Sensors mounted in or on the vehicle for detecting the environment of the vehicle.

A signal from the input and/or remote control device to the transceiver device activates an operating mode in the vehicle in which the vehicle moves to a target position independently, i.e., without the assistance of a driver located in the vehicle. The target position is in a first direction of travel of the vehicle. This means that the target position is located in a region in front of or behind the vehicle.

According to an example embodiment of the present invention, the vehicle, in the operating mode, also moves in the second direction of travel opposite the first direction of travel depending on the detected environment. This means that, according to the present invention, the vehicle can also move away from the target position in order to reach the target position.

In order to understand the present invention, an application on which the present invention is based will first be explained in more detail at this point:

The underlying driver-assistance function is a parking and maneuvering function that allows the vehicle to automatically avoid obstacles at a low speed, for example of approx. 2 km/h maximum, and/or travel along walls. The function is generally controlled in what is known as remote operation, i.e., the driver is not located in the vehicle but is located outside the vehicle in the immediate vicinity (e.g. within a maximum distance of 6 m) of the vehicle. The driver can drive the vehicle forward or backward by pressing a corresponding button of a remote control unit, for example a smartphone app. Lateral and longitudinal guidance (i.e., steering, braking or propulsion) is typically controlled by a parking control unit in such a way that obstacles in the vehicle environment between the vehicle and the target position are avoided as much as possible. If an obstacle cannot be avoided due to its unfavorable position, for example directly centrally in front of the vehicle, the vehicle stops immediately in front of the obstacle.

The most important application for such a function is when entering and exiting garages, the narrow width of which makes it difficult to exit and enter comfortably. When entering the garage, the target position is inside the garage; when exiting the garage, the target position is the space in front of the garage where the occupants of the vehicle can comfortably get in.

In the existing systems, an obstacle can only be avoided if it projects into the straight extension of the vehicle contour by a certain maximum distance, typically 30 cm. When entering a garage, this applies in particular to the side garage door posts. This means that to make it possible to enter a garage, the vehicle must be positioned at the start of the function in such a way that the garage door posts project into the straight extension of the vehicle contour by no more than approximately 30 cm ("maximum intrusion distance"), i.e., the vehicle must not be parked with too much of an offset with respect to the garage entrance. In this case (parked with a large offset), it only travels straight toward one of the garage door posts and stops in front of it without steering, i.e., it cannot enter the garage.

An advantage of the present invention is that even in such situations (the vehicle is parked with a large offset with respect to the garage), it is possible to avoid the obstacle, in this case the garage door, thus allowing the garage to be entered.

In this particular case of an application of the present invention, i.e., in the case where the vehicle stops in front of the garage door post and cannot continue its journey into the garage, the vehicle, according to an example embodiment of the present invention, initially travels in reverse (or forward, if the approach to the garage was made while reversing) and thus moves away from the obstacle or garage door post and the desired target position inside the garage. In the meantime, the steering of the vehicle is controlled such that the vehicle turns away from the garage door post, i.e., the vehicle turns in such a way that the garage door post projects into the travel path only within the "maximum intrusion distance."

As a result, the garage door post can be avoided during the subsequent movement in the original direction of travel (forward or reverse travel), whereby the vehicle can enter the garage.

Advantageously, at least the environment located in the vicinity of the vehicle between the vehicle and the target position is thus detected.

An obstacle located between the vehicle and the target position is then detected and it is checked whether the obstacle projects into the travel path of the vehicle in a predeterminable first manner. The travel path is specified by the outer contour of the vehicle by means of an imaginary straight-line travel in the first direction of travel, i.e., in the direction of the target position.

In particular, it is provided that at least the steering of the vehicle is actuated in the operating mode (remote operation). Only in this way can the obstacles be avoided. In this case, the steering is actuated during the movement in the second direction of travel, i.e., opposite to the target position, depending on which side of the vehicle the obstacle is detected. The vehicle thus moves to a new starting position for the subsequent movement in the first direction of travel, from which the obstacle can then be avoided. This means that the vehicle (2) is moved in the second direction of travel (31) until the position of the detected obstacle with respect to the vehicle orientation allows it to be avoided.

In particular, it is provided that the vehicle (2) is moved in the second direction of travel (31) until the detected obstacle (35) projects into the travel path (FS) of the vehicle (2) in a predeterminable second manner. In this case, it is provided in particular that the projection in a first manner is greater than the projection in a second manner.

The vehicle is moved in the second direction of travel until the detected obstacle projects into the travel path of the vehicle in a predeterminable second manner (the obstacle projects into the travel path within the "maximum intrusion distance"). In this case, it is provided in particular that the projection in a first manner is greater (in particular greater than the above-mentioned "maximum intrusion distance") than the projection in a second manner (in particular smaller than the above-mentioned "maximum intrusion distance").

As already mentioned, after the movement in the second direction of travel, the vehicle advantageously moves in the first direction of travel.

According to an example embodiment of the present invention, with regard to communication with the user, who is usually located outside the vehicle, the following can be provided:

the movement in the second direction of travel, i.e., away from the target position, a signal is output from the transceiver device in the vehicle to the input and/or remote control device. This can either be done to inform the user only, or the user must approve this direction of movement. This means that the movement in the second direction of travel takes place only by means of an (approval) signal from the input and/or remote control device to the transceiver device.

After the movement in the second direction of travel and before the movement in the first direction of travel, a signal can also be output from the transceiver device to the input and/or remote control device. This can also be done either to inform the user only, or the user must approve this change in the direction of movement. This means that the movement in the first direction of travel (after the one in the second direction of travel) takes place only by means of an (approval) signal from the input and/or remote control device to the transceiver device.

The general idea of the present invention, based on the specific application already described, means that the target position is a parking space, in particular in a garage, and/or the input and/or remote control device is operated by a person located outside the vehicle, and/or the obstacle is the vehicle-side boundary of the parking space, in particular the entry boundaries of a garage.

Further advantageous embodiments of the present invention are disclosed herein.

BRIEF DESCRIPTION OF THE DRAWINGS

Exemplary embodiments of the present invention are explained in greater detail with reference to the figures and the following description.

DETAILED DESCRIPTION OF EXAMPLE EMBODIMENTS

The figures show schematic representations of exemplary embodiments of the present invention.

Figure 1:
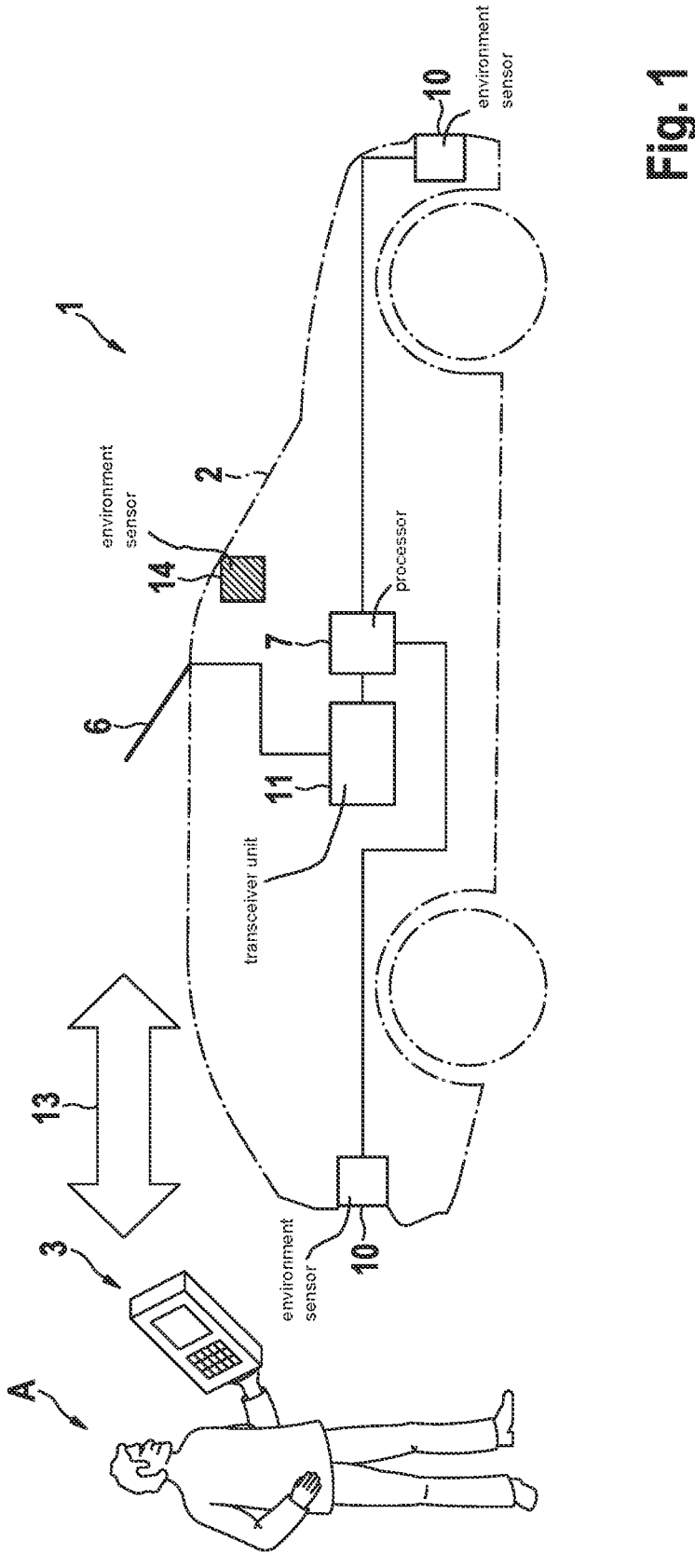
FIG. 1 is a schematic representation of the components of the present invention on the basis of an exemplary embodiment of the present invention.

FIG. 1 shows an overview in which a user A is holding a remote control 3 as a remote control device. The remote control 3 is configured to communicate with a transceiver unit 11 of the vehicle 2 via the antenna 6. This communication takes place via signals 13. To evaluate the control commands, the vehicle 2 has a processor 7 that also receives and processes signals from the environment sensors 10 and 14 and controls the drive and/or the brakes and/or the steering of the vehicle 2. The term "remote control" or "remote control device" simply refers to an input means that can be operated by the driver or a user. The driver or user does not necessarily have to be outside the vehicle when making inputs.

Ultrasound and/or video and/or radar-based sensors 10/14 and/or LIDAR sensors can be provided as environment sensors.

In such systems, four cameras are generally used as the camera, with which the entire environment of the vehicle 2 can be captured. These cameras are usually located centrally in the front below the hood, in the rear under the trunk lid, and in the side rear view mirrors.

Figure 2A:
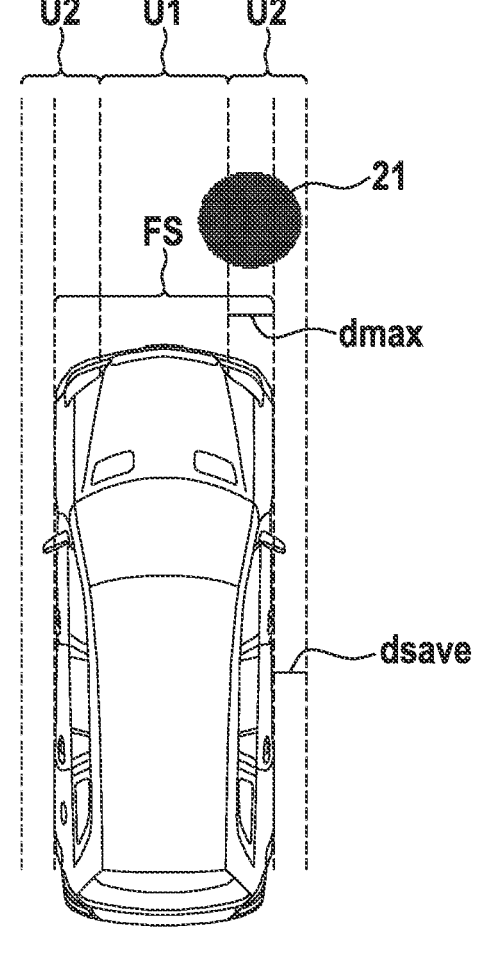
FIGS. 2A, 2B, and 3 show the spatial conditions of an exemplary embodiment of the present invention.
Figure 2B:
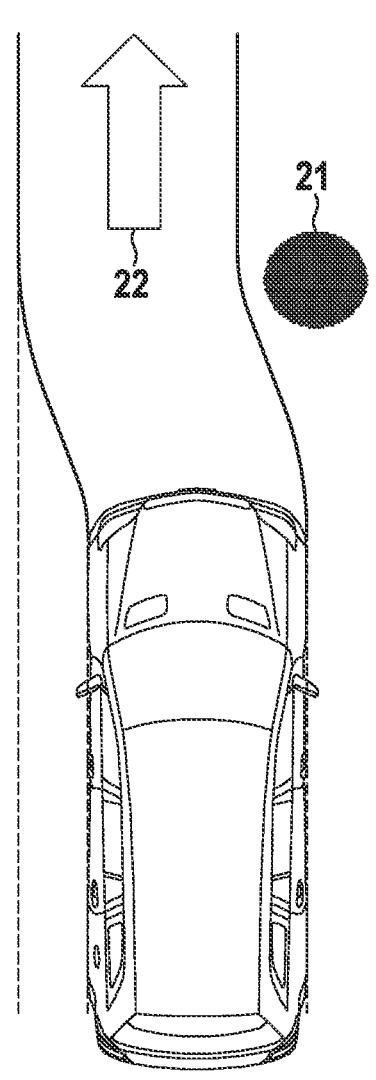

FIGS. 2A and 2B show the situation already described at the outset.

A vehicle 2 that is in front of an obstacle 21 can be seen in FIG. 2A. The obstacle 21 projects into the travel path indicated with FS. The value dmax denotes the value by which the obstacle 21 can project maximally into the travel path FS, so that it can be avoided by the vehicle 2 in the direction of travel 22 toward the obstacle 21. The value dmax is associated with the distance of the vehicle 2 from the obstacle 21 and the maximum steering angle. If the obstacle 21 projects into the lane, as shown in FIG. 2A, avoidance is not possible (region U1).

If the obstacle did not project into the travel path beyond dmax, avoidance in the direction 22 (FIG. 2B) would be possible in the regions U2. In addition, a safety distance dsave should always be maintained.

A vehicle 2 that is in front of an obstacle 21 is also shown in FIG. 2B. In the configuration shown FIG. 2B, however, the obstacle 21 does not project into the travel path indicated by FS beyond the value dmax. As shown in FIG. 2B, the obstacle 21 can thus be avoided in the direction of travel 22.

Figure 5:
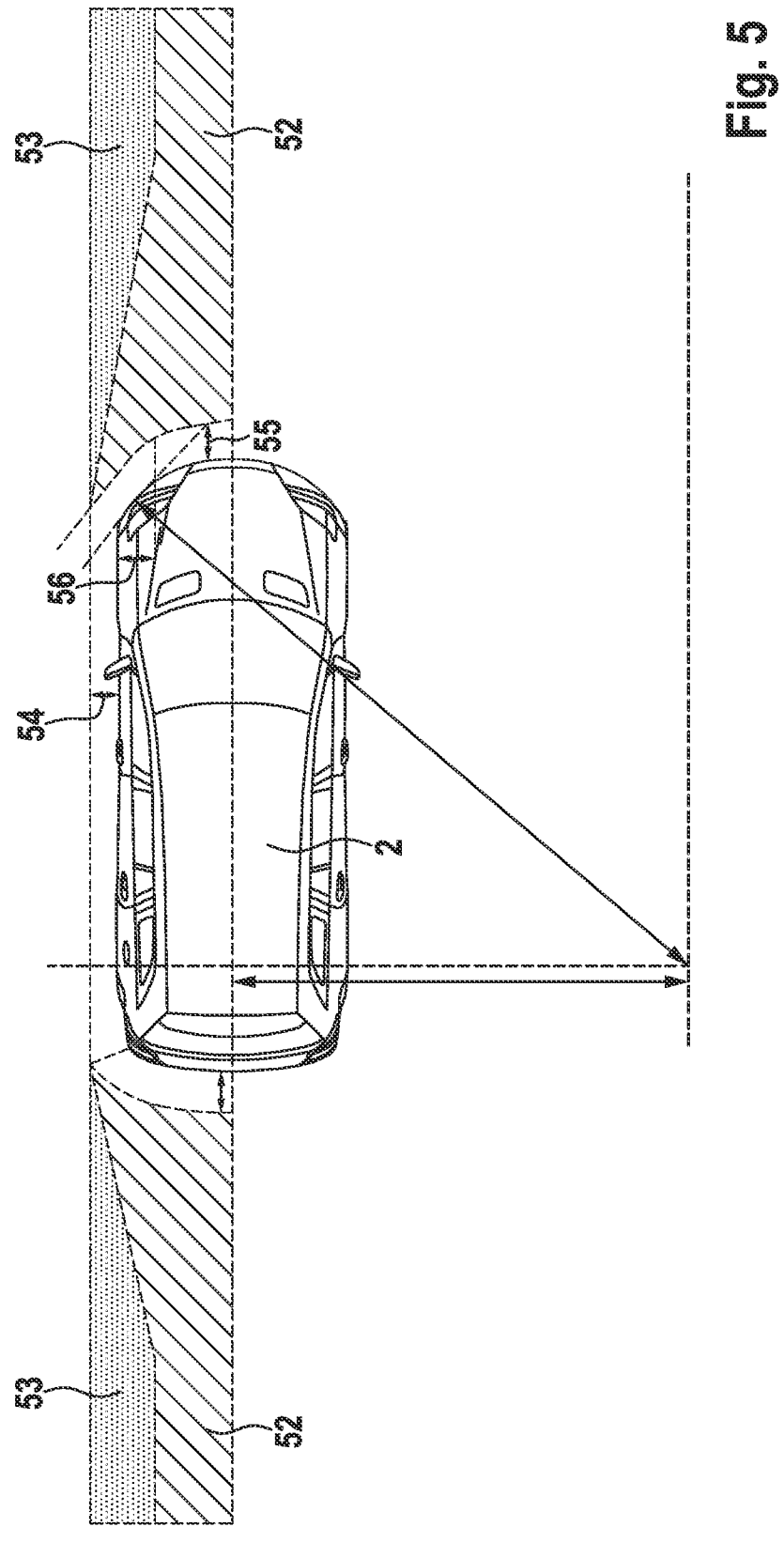
FIG. 5 shows another exemplary embodiment of the present invention.

On the basis of FIG. 5, which is still to be described, the criteria for whether or not avoidance is possible are specified more precisely. These criteria relate in particular to the position of the obstacle 21 at the time of activation of the function according to the present invention. This means that if the obstacle 21 is already very close to the vehicle 2 at the time of activation, the effective distance dmax, which dictates any avoidance, can also be smaller.

Figure 3:
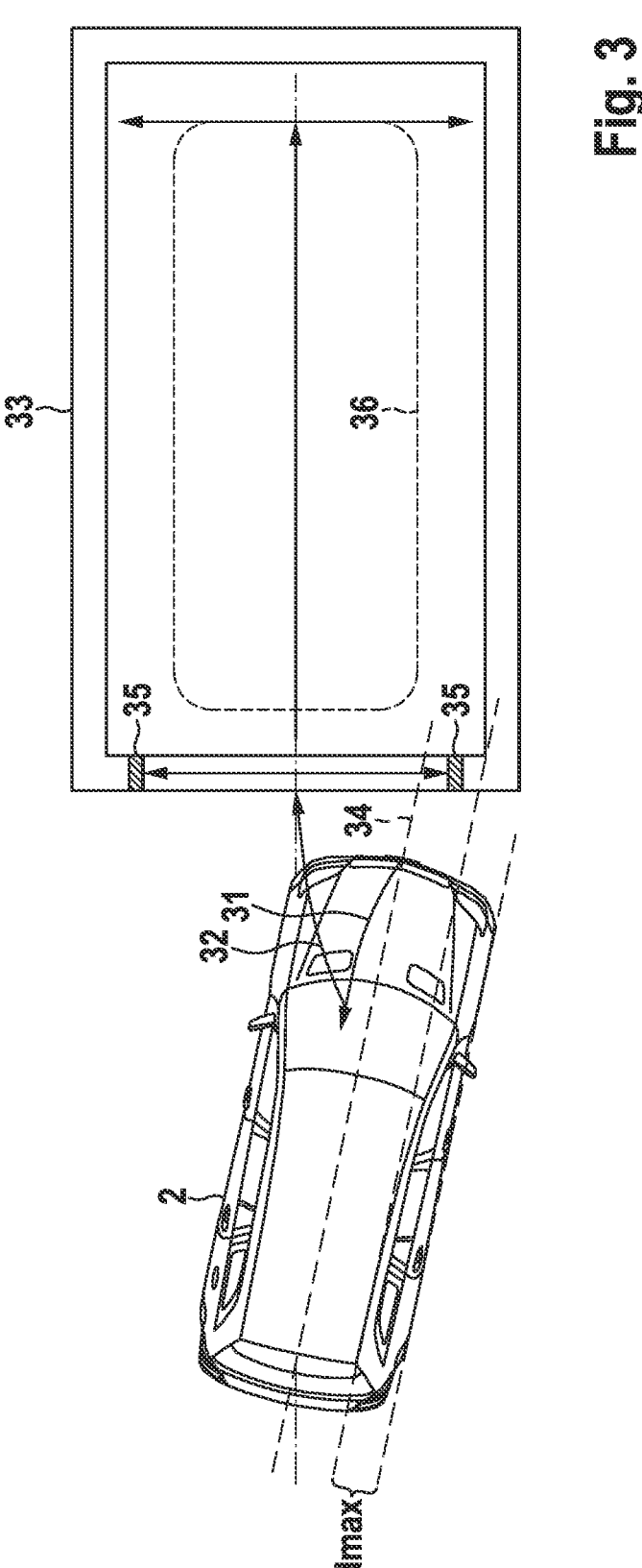

In FIG. 3, the present invention is described in its entirety with reference to an exemplary embodiment.

If the vehicle 2, as can be seen in FIG. 3, is in front of the obstacle, in this case in front of the garage door post 35, the following takes place in this exemplary embodiment according to the present invention:

1. The vehicle 2 travels straight ahead toward the obstacle or the garage door post 35. The garage door post 35 projects laterally into the travel path FS by more than the maximum intrusion distance dmax. However, the post 35 is still located completely on one side of the vehicle center line 34. This condition is necessary because the steering direction (left/right) during the subsequent move in reverse 31 and thus the direction of the subsequent object avoidance (direction 32) must still be clearly defined.

2. The vehicle 2 stops just in front of the garage door post 35 (at a distance corresponding to the longitudinal safety distance).

3. Now, one of the following optional steps is carried out (further similar options are possible):
   a. The driver/user A receives a message on their remote control 3, e.g.
      "Obstacle detected. Reset to avoid obstacle?". This message must be confirmed by the driver/user A. The function then selects the direction of travel 31 "reverse."
   b. The driver/user receives e.g. the message
      "Obstacle detected, avoidance possible after reset". The driver/user A independently selects the direction of travel "reverse."
   c. The following message is sent
      "Obstacle detected, vehicle resetting to avoid obstacle."
      The function independently selects the new direction of travel 31 "reverse," without any action/approval on the part of the driver.
   d. No message is sent and the function independently selects the new direction of travel 31 "reverse," without any action/approval on the part of the driver.

4. The steering of the vehicle 2 is, according to the object position
   garage door post 35 completely to the left of the vehicle center line 34, steering to the left
   garage door post 35 completely to the right of the vehicle center line 34, steering to the right.
   In this case, the largest possible steering angle is advantageously selected.

5. The vehicle 2 now travels in reverse (and turns about its vertical axis) until the garage door post 35 is located completely within the maximum intrusion distance dmax with respect to the straight extension of the vehicle contour, and then stops.

6. One of the following optional steps (see point 3 above) is carried out (further similar options are possible):
   a. The driver/user A receives a message, e.g.
      "Reset complete.
      Move forward again to avoid obstruction?"
      This message must be confirmed by the driver/user A. The function then selects the direction of travel 32 "forward".

b. The driver/user A receives e.g. the message
      "Reset complete.
      Avoidance possible after moving forward again."
      The driver/user A then independently selects the direction of travel 32 "forward."
   c. The following message is sent
      "Reset complete, vehicle is moving forward again to avoid obstruction."
      The function independently selects the new direction of travel 32 "forward," without any action on the part of the driver/user A.
   d. No message is sent and the function selects the new direction of travel 32 "forward" independently, without any action/approval on the part of the driver/user A.

7. The vehicle 2 moves again in the original direction of travel 32 (here: forward). In this case, the garage door post is avoided (because the above conditions for object avoidance are now met), and the vehicle 2 can enter the garage 33 and move to the target position 36.

Figure 4:
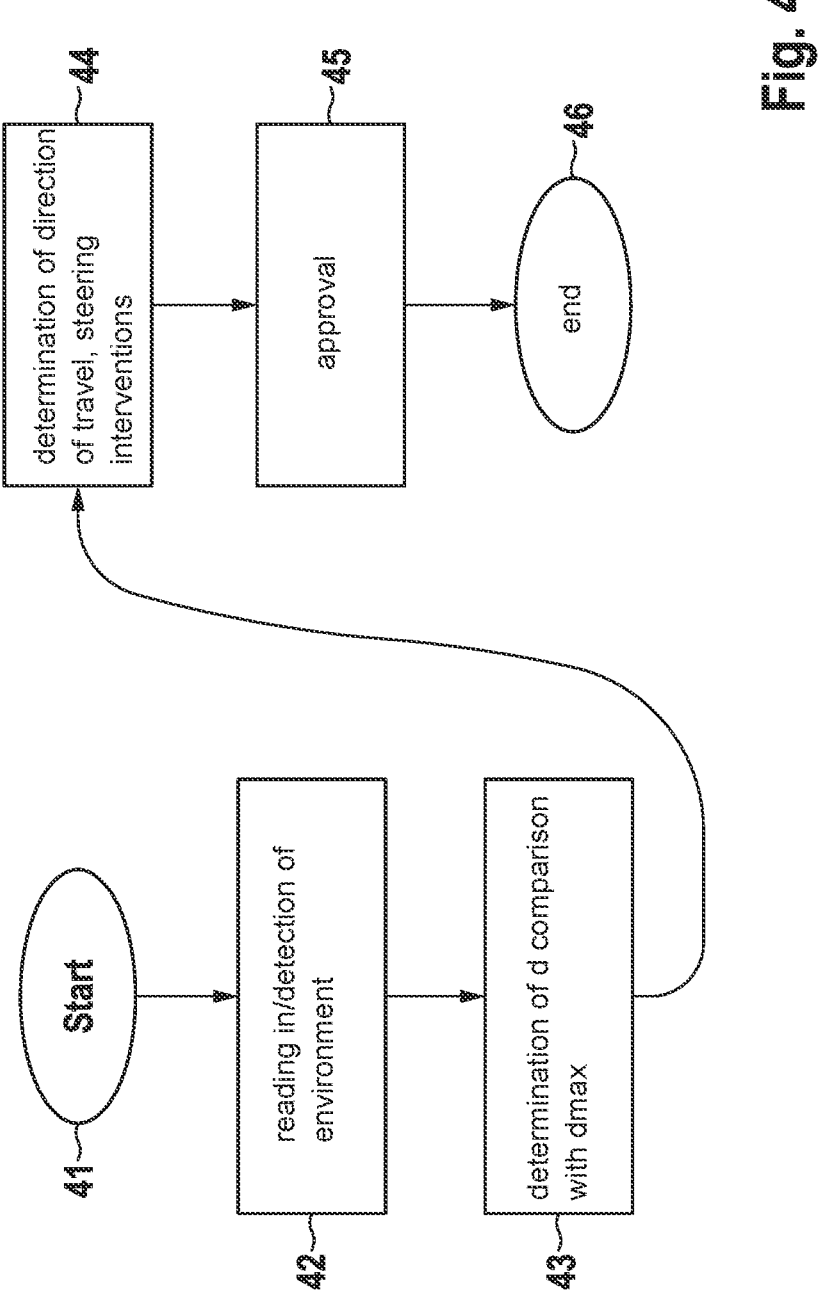
FIG. 4 schematically shows a sequence of the exemplary embodiment according to the present invention.

In FIG. 4, after the start step 41, in method step 42 the data from the environment sensors 10 and 14 are read in and evaluated, in particular with respect to the position of possible obstacles 21/35 relative to the vehicle. In step 43, the projection d of an object detected as an obstacle into the travel path FS is then determined on the basis of the results obtained in step 42. This value d is then compared with the maximum intrusion distance dmax already described.

Depending on this comparison, the direction of travel and optionally the steering interventions to be set are determined in step 44.

If the comparison in step 43 reveals that the detected obstacle does not project into the travel path beyond the maximum intrusion distance dmax, the obstacle is avoided in direct travel to the target position.

If the comparison in step 43 reveals that the detected obstacle projects into the travel path beyond the maximum intrusion distance dmax, a reverse travel with a corresponding steering angle is determined in step 44.

The approval and/or informing of the driver/user A takes place in step 45.

After the end step 46, the sequence shown in FIG. 4 is run through again. If, for example in a determination in step 44, a direction of travel opposite to the target position is determined, this movement is carried out with the "correct" steering angle until it is detected in step 43 that the detected obstacle does not project into the travel path beyond the maximum intrusion distance dmax. The direction of travel is then changed in step 44 and the obstacle is avoided.

The method described in the last paragraph assumes that the vehicle 2 is optionally moved back and forth several times. In a practical version of the present invention, this is expected to be undesirable. In such a practical version, the number of applications, i.e., the number of reverse movements, is limited to 1.

FIG. 5 shows another exemplary embodiment of the present invention. Here again, the vehicle is denoted by the reference sign 2. The regions 52 are cross-striped in front of and behind the vehicle. If an obstacle is positioned within these regions 52, the vehicle 2 cannot avoid these obstacles. The dimensions of these regions are determined substantially by the vehicle geometry and the steering angles to be set. The turning radius, shown diagonally in FIG. 5, and the steerable axle (pure front axle steering or co-steering rear axle steering) play a role here. The intrusion distance of, for example, 30 cm is given by reference sign 56.

Length information can be found in FIG. 5 by way of example. In particular, a lateral safety distance 54 of 25 cm and a longitudinal safety distance 55 of 30 cm are applied here. If the position of the obstacle is detected outside the regions 52 in the regions 53, this obstacle can be avoided directly, i.e., without reversing the direction of travel according to the present invention.

The invention claimed is:

1. A method for remote control of a vehicle using an input or remote control device, the vehicle includes a transceiver device, which is configured to exchange signals with the input or remote control device, and the vehicle has sensors for detecting an environment of the vehicle, the method comprising the following steps:

activating an operating mode of the vehicle by a signal to the transceiver device, wherein in the operating mode, the vehicle automatically moves to a target position, and wherein the target position is located in a first direction of travel of the vehicle;

wherein the vehicle, in the operating mode, also moves in a second direction of travel opposite the first direction of travel depending on the detected environment;

detecting an obstacle located between the vehicle and the target position, wherein the vehicle then moves in the second direction of travel when it is detected that the obstacle projects into the travel path of the vehicle in a predeterminable first manner;

wherein the travel path is specified by an outer contour of the vehicle using an imaginary straight-line travel in the first direction of travel.

2. The method according to claim 1, wherein at least an environment located in a vicinity of the vehicle between vehicle and the target position is detected as the environment.

3. The method according to claim 1, wherein a least steering of the vehicle is actuated in the operating mode.

4. The method according to claim 1, wherein steering is actuated during the movement in the second direction of travel depending on which side of the vehicle the obstacle is detected.

5. The method according to claim 4, wherein the vehicle is moved in the second direction of travel until a position of the detected obstacle with respect to the vehicle orientation allows it to be avoided, wherein, the vehicle is moved in the second direction of travel until the detected obstacle projects into the travel path of the vehicle in a predeterminable second manner, and wherein, the projection in a first manner is greater than the projection in a second manner.

6. The method according to claim 5, wherein the vehicle is moved in the first direction of travel after the movement in the second direction of travel.

7. The method according to claim 1, wherein:

before the movement in the second direction of travel, a signal is output from the transceiver device to the input or remote control device, wherein the movement in the second direction of travel takes place only by a signal from the input or remote control device to the transceiver device, and after the movement in the second direction of travel and before movement in the first direction of travel, a signal is output from the transceiver device to the input or remote control device, wherein the movement in the first direction of travel takes place only by a signal from the input or remote control device to the transceiver device.

8. The method according to claim 1, wherein:

the target position is a parking space in a garage, the input or remote control device is operated by a person located outside the vehicle, and the obstacle is a vehicle-side boundary of the parking space, including entry boundaries of a garage.

9. An apparatus for remote control of a vehicle, comprising:

a vehicle and an input or remote control device, wherein:

the vehicle includes a transceiver device, which is configured to exchange signals with the input or remote control device, the vehicle has sensors for detecting an environment of the vehicle, an operating mode of the vehicle is activated by a signal to the transceiver device, wherein in the operating mode, the vehicle automatically moves to a target position, wherein the target position is located in a first direction of travel of the vehicle, and in the operating mode, the vehicle also moves in a second direction of travel opposite the first direction of travel depending on the detected environment;

wherein the vehicle is configured to:

detect obstacles located between the vehicle and the target position are detected, and move in the second direction of travel when it is detected that the obstacle projects into the travel path of the vehicle in a predeterminable first manner;

wherein the travel path is specified by an outer contour of the vehicle using an imaginary straight-line travel in the first direction of travel.

10. The apparatus according to claim 9, wherein:

the target position is a parking space in a garage, the input or remote control device is operated by a person located outside the vehicle, and the obstacle is a vehicle-side boundary of the parking space including entry boundaries of a garage.

* * * * *